(12) United States Patent
Erimli et al.

(10) Patent No.: US 6,405,258 B1
(45) Date of Patent: Jun. 11, 2002

(54) METHOD AND APPARATUS FOR CONTROLLING THE FLOW OF DATA FRAMES THROUGH A NETWORK SWITCH ON A PORT-BY-PORT BASIS

(76) Inventors: Bahadir Erimli, 2249 Wren Way, Campbell, CA (US) 95008; Robert Williams, 22255 Canyon View Cir., Cupertino, CA (US) 95014; Shashank Merchant, 1063 Morse Ave. #11-305, Sunnyvale, CA (US) 94089

( * ) Notice: Subject to any disclaimer, the term of this patent is extended or adjusted under 35 U.S.C. 154(b) by 0 days.

(21) Appl. No.: 09/304,963

(22) Filed: May 5, 1999

(51) Int. Cl.$^7$ .............................................. G06F 13/00
(52) U.S. Cl. ....................... 709/235; 370/235; 370/236; 709/232
(58) Field of Search ............................... 709/235, 232; 370/235, 236

(56) References Cited

U.S. PATENT DOCUMENTS

| | | | |
|---|---|---|---|
| 5,515,376 A | | 9/1996 | Murthy et al. |
| 6,026,075 A | * | 2/2000 | Linville et al. ............. 370/236 |
| 6,031,821 A | * | 2/2000 | Kalkunte et al. ........... 370/235 |
| 6,084,856 A | * | 7/2000 | Simmons et al. ........... 370/235 |
| 6,098,103 A | * | 8/2000 | Dreyer et al. ................ 709/234 |
| 6,115,356 A | * | 9/2000 | Kalkunte et al. ........... 370/229 |
| 6,167,029 A | * | 12/2000 | Ramakrishnan ............. 370/235 |
| 6,167,054 A | * | 12/2000 | Simmons et al. ........... 370/422 |
| 6,192,028 B1 | * | 2/2001 | Simmons et al. ........... 370/229 |
| 6,252,849 B1 | * | 6/2001 | Rom et al. ................... 370/230 |
| 2002/0012340 A1 | * | 1/2002 | Kalkunte et al. ........... 370/360 |
| 2002/0012341 A1 | * | 1/2002 | Battle et al. ................. 370/378 |

* cited by examiner

*Primary Examiner*—Kenneth R. Coulter (57) ABSTRACT

An apparatus and method are disclosed for regulating the flow of data between plural network stations through a network switch. A receive port functions to receive data frames from a first network station, and a transmit port outputs the received data frames to a second network station. A programmable threshold register is provided for storing a threshold value that indicates a saturation level for the internal resources of the transmit port. Control circuitry is used to monitor the internal resources of the transmit port and determine whether or not the threshold value has been reached. If the threshold value has been reached, then the control circuitry will implement a flow control process that causes the first network station to discontinue transmission of data frames to the transmit port until the internal resources of the transmit port fall below the threshold value.

22 Claims, 8 Drawing Sheets

METHOD AND APPARATUS FOR CONTROLLING THE FLOW OF DATA FRAMES THROUGH A NETWORK SWITCH ON A PORT-BY-PORT BASIS

BACKGROUND OF THE INVENTION

1. Field of the Invention

The present invention relates to communication systems, and more particularly, to a method and apparatus for selectively controlling the flow of data between plural network stations.

2. Description of the Related Art

Modern communication systems, such as computer networking systems or communication networks, provide constant transmission of data between end stations and/or intermediate stations such as routers and signal amplifiers. Computer networking systems, such as packet switched networks (e.g., Ethernet networks), often require transmission of data to a single end station or to multiple end stations within the network. The data originates from a user program, and is segmented into multiple data frames and subsequently transmitted in order to simplify processing and minimize the retransmission time required for error recovery. For example, in a conventional e-mail system, a user may desire to send the same e-mail message to four different users that are connected to the e-mail system. Accordingly, the identical data would be directed to multiple end stations.

Packet switched computer networks typically employ a network switch that receives and forwards data frames to individual and/or multiple end stations. The switch makes forwarding decisions upon receipt of data frames based on information contained in a header of each data frame. For example, if a received data frame is to be transmitted to a number of end stations, the switch must make the forwarding decision to forward the data frame to the ports of the correct end stations.

Depending on the specific implementation and/or characteristic of the networking system (i.e., data transfer rate, traffic intensity), buffers must be provided for temporary storage of the data frames received by the switch, until forwarding decisions can be made. Without the use of buffers, there is a great likelihood that data frames will be lost, hence requiring retransmission and reducing the overall efficiency of the system. The buffers used by the switch to store the data frames are often implemented as queue structures. There are many types of electronic data systems in which queues are used. These include microprocessors, memory transfer systems, airline telephone reservation systems, and packet switched networks. An example of a queue from everyday life is a customer line, at a bank or an airport ticket counter.

In most systems, it is desirable that the queues have low latencies so that processing of an entry is not delayed very long due to delays caused by the queues themselves. A low queue latency means that an entry will flow from the entrance to the queue to the exit of the queue quickly, in comparison to queues with higher latencies. One factor that has a significant impact on the latency of a queue is the length, or capacity, of the queue. The greater the capacity of the queue to store entries, the higher the latency of the queue.

During normal operation, however, there is always a possibility that the network will become congested. Network congestion occurs if a receiving network element, for example a receiving network station, is unable to receive data at a rate that is greater than or equal to the transmission rate of the transmitting element. For example, traffic in a client-server environment is dominated by client requests followed by a burst of frames from the server to the requesting client. Hence, only a limited number of client requests can be output to the server from the switched hub at the assigned switching port. If the number of client requests exceeds the capacity of the server's buffer, some of the data packets will be lost. In another example, a client having limited buffer space may be unable to keep up with the transmission rate of a transmitting station, again resulting in lost packets. Finally, network congestion may occur if a one or more transmitting stations attempt to transmit data packets, via the network switch, to a receiving station that is already in the process of receiving data packets from another transmitting station. Hence, the receiving station may be unable to keep up with reception of data packets from two separate transmitting stations.

Various types of flow control protocols have been proposed to address the problems associated with network congestion. Flow control techniques typically attempt to reduce network congestion by forcing a sending station to temporarily suspend transmission of data packets to another station that is congested. A proposed flow control arrangement for a duplex environment, referred to as IEEE 802.3x [2], specifies generation of a flow control message, for example a PAUSE frame, to regulate the transfer of data and reduce congestion. A transmitting station that receives such a PAUSE frame enters an inactive state in which no frames are sent on the network for a time interval specified in the PAUSE frame.

One problem associated with such flow control proposals, however, is the assumption that flow control should be initiated when a receive buffer is full, which still results in a loss of data. Another problem associated with existing flow control proposals is that the PAUSE frame is often sent to all stations in the network, hence resulting in a significant reduction in network activity every time one station experiences congestion.

Furthermore, the existing proposals do not describe how to determine the instance in which flow control should be initiated. These problems become more complex in a switched environment, where a network switch must route data packets received from a plurality of transmitting stations to the appropriate destination stations. Moreover, if the flow control duration is too short, a receiving station may still lose portions of the transmitted data. If the duration is too long, the transmitting station remains idle, hence reducing network throughput.

DISCLOSURE OF THE INVENTION

There exists a need for an arrangement capable of quickly and efficiently controlling the flow of data between multiple workstations while minimizing the loss of data frames.

There is also a need for an arrangement capable of applying flow control techniques to selected network stations in order to maintain maximum throughput for stations within the network that are not congested.

These and other needs are addressed by the present invention wherein a PAUSE frame is selectively transmitted to a network station in order to temporarily discontinue transmission of data to the congested network station.

In accordance with one aspect of the present invention, a method of regulating the flow of data between plural network stations through a network switch comprises the steps: setting threshold values that indicate a saturation level for internal resources of each transmit port of the switch; receiving, by a receive port of the network switch, a data frame destined to the transmit port, the data frame being received from a first one of the plural network stations; determining if the internal resources of the transmit port have reached the threshold value of that transmit port; and selectively transmitting a PAUSE frame that specifies a pause interval value if the internal resources of that transmit port have reached the threshold values, the PAUSE frame causing the first network station to discontinue transmission of data frames to that transmit port for the duration of the pause interval value. The saturation level corresponds to a level that, if exceeded, can result in a loss of data by a particular port of the network switch. One advantage of the present invention is that the PAUSE frame requires the first network station to discontinue transmission of data frames only to the transmit port whose internal resources have reached the threshold value. This allows a host CPU to efficiently control traffic through the multiport switch by selectively causing transmitting network stations to discontinue transmission to congested ports.

According to another aspect of the invention, an arrangement is provided for regulating the flow of data between plural network stations through a network switch, wherein the plural network stations are connectable to the network switch. The arrangement includes a receive port, a transmit port, a programmable threshold register, and control circuitry. The receive port receives data frames from a first network station, while the transmit port outputs the received data frames to a second network station. The programmable threshold register is used to store a threshold value that indicates a saturation level for the internal resources of the transmit port. The control circuitry monitors the internal resources of the transmit port to determine if the threshold value is reached. If the threshold value has been reached, then the control circuitry transmits a PAUSE frame to the first network station. The PAUSE frame specifies a pause interval value that causes the first network station to discontinue transmission of data frames to the transmit port until the duration of the pause interval value has expired. An important feature of the present invention is the ability to identify congested ports and selectively discontinue transmission of data to the identified ports without affecting other ports of the network switch. Hence, efficient control of traffic through the multiport switch may be achieved.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
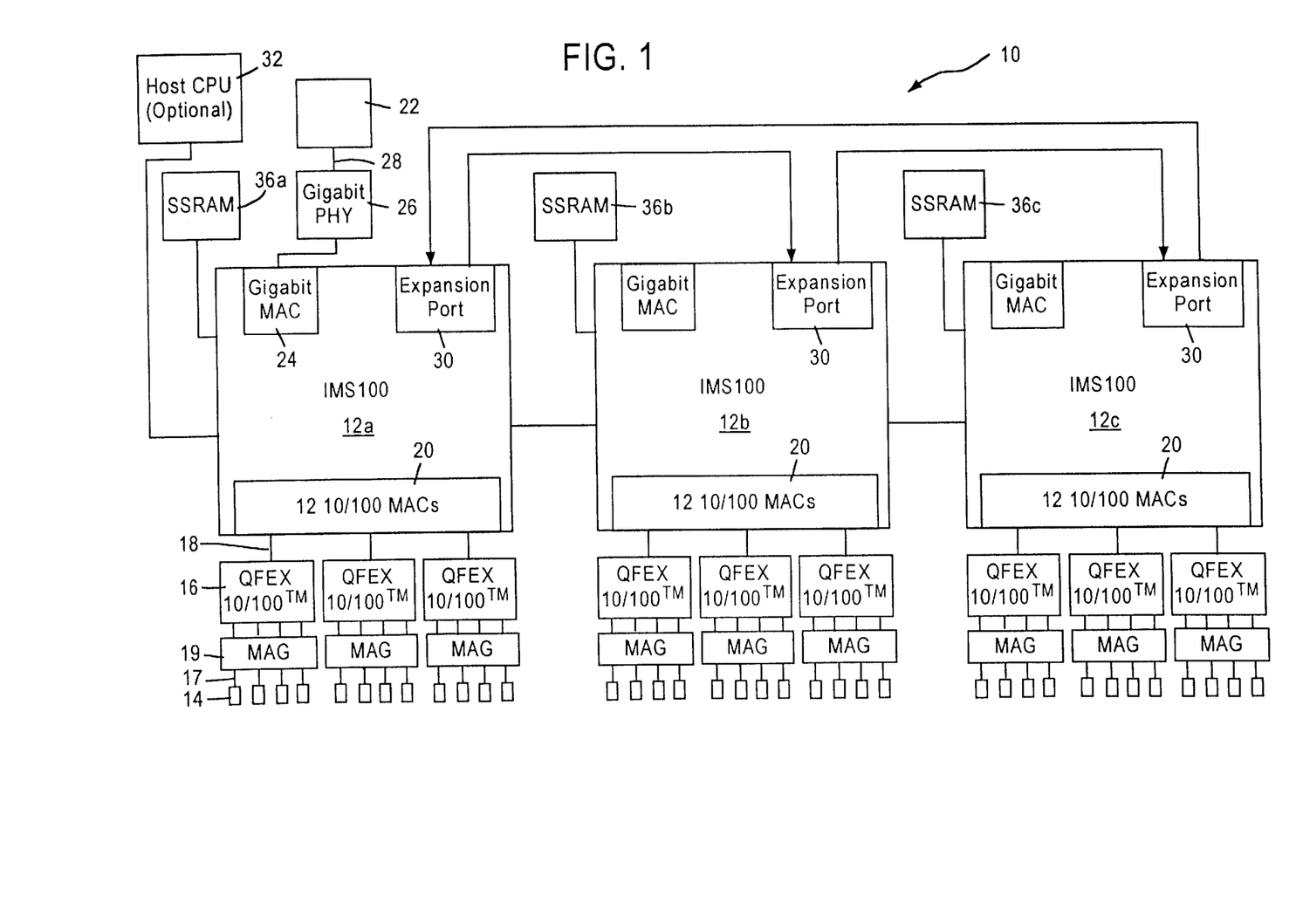
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMI) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
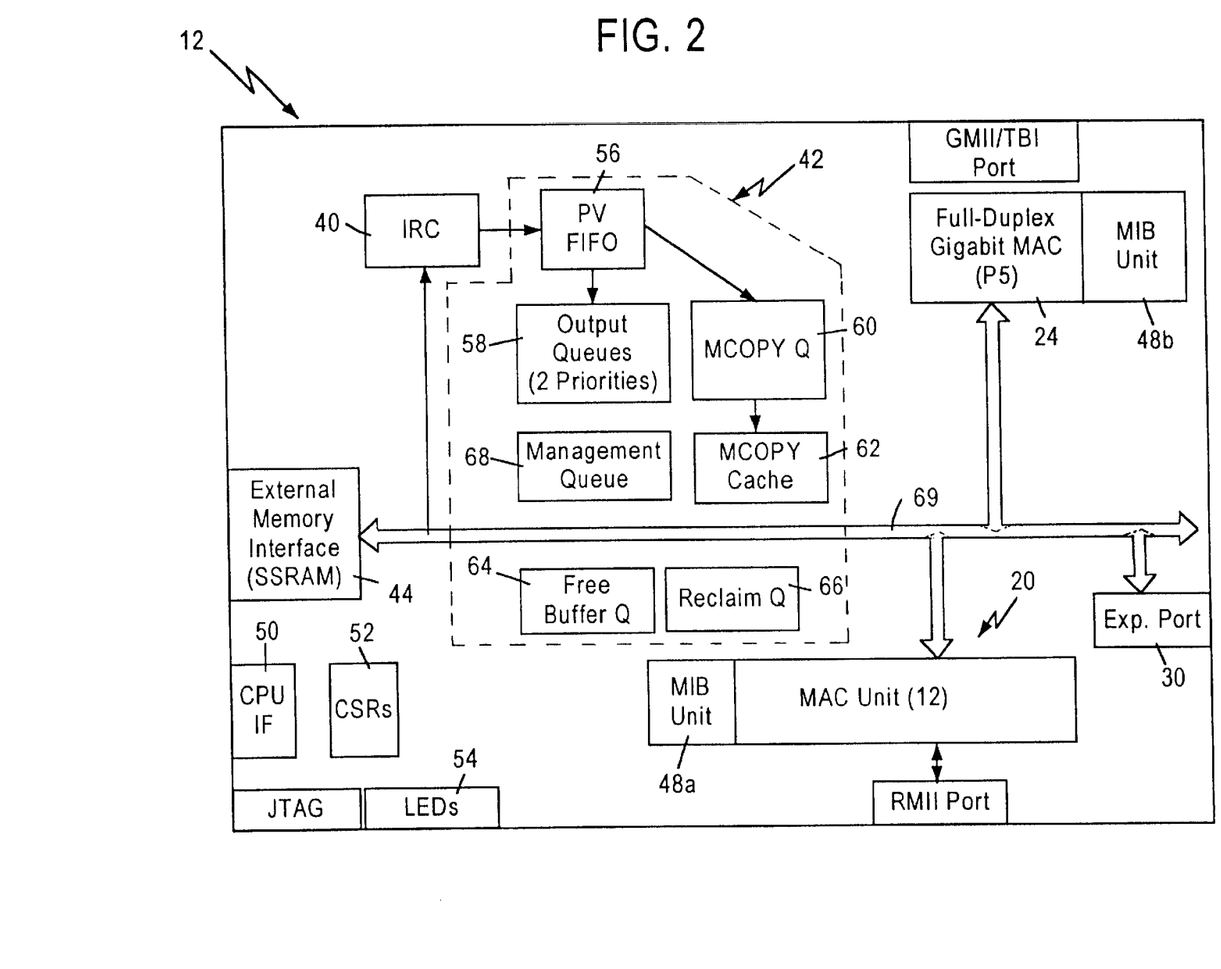
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports (i.e., broadcast) or no ports (i.e., discarded). For example, each data frame includes a header having source and destination address, where the decision making engine 40 may identify the appropriate output MAC port based upon the destination address. Alternatively, the destination address may correspond to a viral address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The format of the forwarding descriptor will discussed further with respect to FIG. 7. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figures 3, 3A:
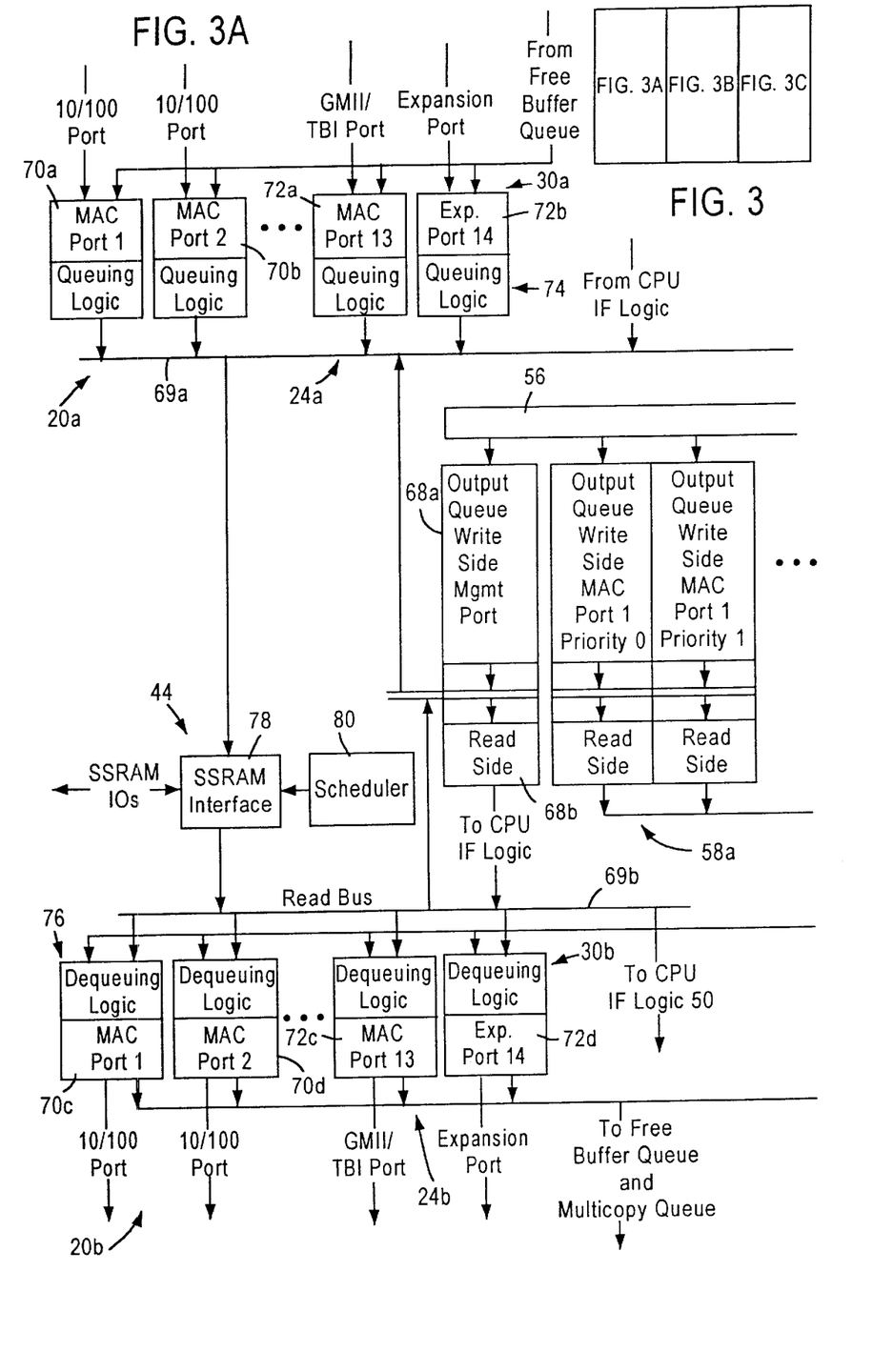
FIG. 3 is a block diagram illustrating in detail the switching subsystem of FIG. 2.
Figure 3B:
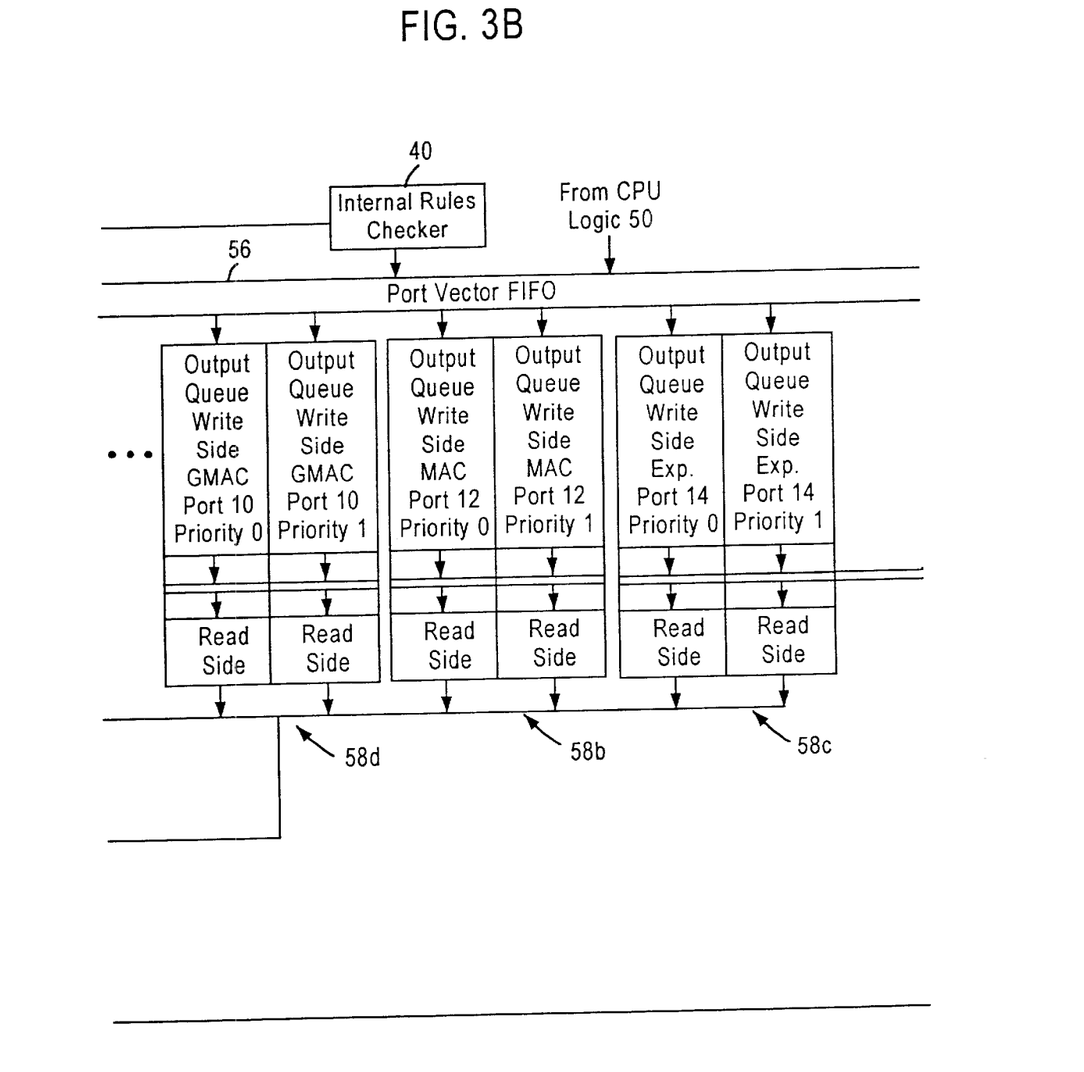
Figure 3C:
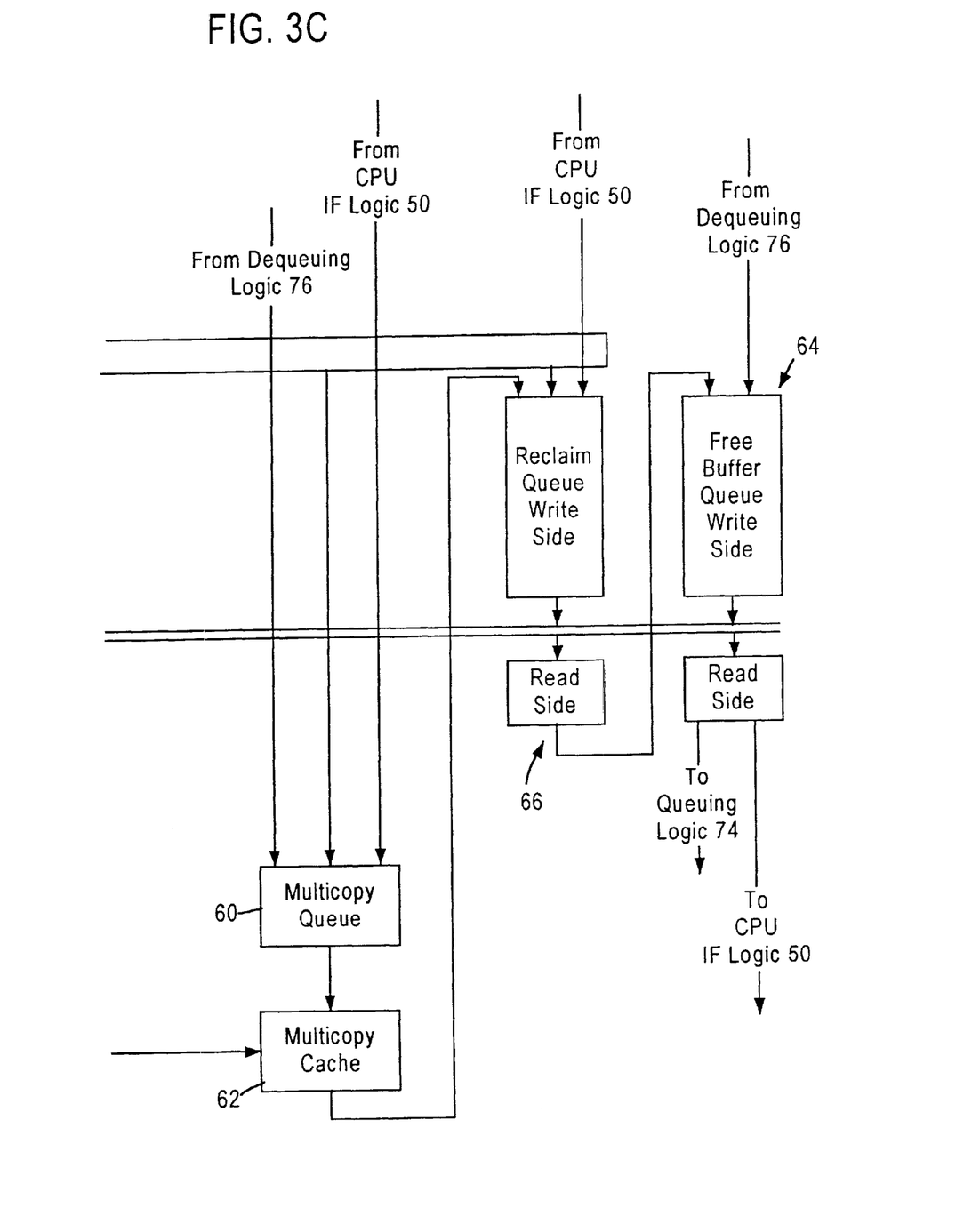

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20*a* and a transmit portion 24*b*. The receive portion 20*a* and the transmit portion 24*b* each include 12 MAC modules (only two of each shown and referenced by numerals 70*a*, 70*b*, 70*c*, and 70*d*) configured for performing the corresponding receive or transmit function according to IEEE 802.3 protocol. The MAC modules 70*c* and 70*d* perform the transmit MAC operations for the 10/100 Mb/s switch ports complementary to modules 70*a* and 70*b*, respectively.

The gigabit MAC port 24 also includes a receive portion 24*a* and a transmit portion 24*b*, while the expansion port 30 similarly includes a receive portion 30*a* and a transmit portion 30*b*. The gigabit MAC port 24 and the expansion port 30 also have receive MAC modules 72*a* and 72*b* optimized for the respective ports. The transmit portions 24*b* and 30*b* of the gigabit MAC port 24 and the expansion port 30*a* also have transmit MAC modules 72*c* and 72*d*, respectively. The MAC modules are configured for full-duplex operation on the corresponding port, and the gigabit MAC modules 72*a* and 72*c* are configured in accordance with the Gigabit Proposed Standard IEEE Draft P802.3z.

Each of the receive MAC modules 70*a*, 70*b*, 72*a*, and 72*b* include queuing logic 74 for transfer of received data from the corresponding internal receive FIFO to the external memory 36 and the rules checker 40. Each of the transmit MAC modules 70*c*, 70*d*, 72*c*, and 72*d* includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69*a* from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69*a*. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70*c*, 70*d*, 72*d*, and 72*c* has an associated output queue 58*a*, 58*b*, 58*c*, and 58*d*, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58*d* for the gigabit transmit MAC 72*c*. The dequeuing logic 76 for the transmit gigabit port 24*b* takes the frame pointer from the corresponding gigabit port output queue 58*d*, and issues a request to the scheduler 80 to read the frame data from the external memory 36 at the memory location specified by the frame pointer. The scheduler 80 schedules the request, and issues a grant for the dequeuing logic 76 of the transmit gigabit port 24*b* to initiate a DMA read. In response to the grant, the dequeuing logic 76 reads the frame data (along the read bus 69*b*) in a DMA transaction from the location in external memory 36 pointed to by the frame pointer, and stores the frame data in the internal transmit FIFO for transmission by the transmit gigabit MAC 72*c*. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20*b*, 24*b*, and/or 30*b*.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of an exemplary output queue will be discussed, followed by the details for controlling the flow of data to a congested network station.

Queue Structure

Figure 4:
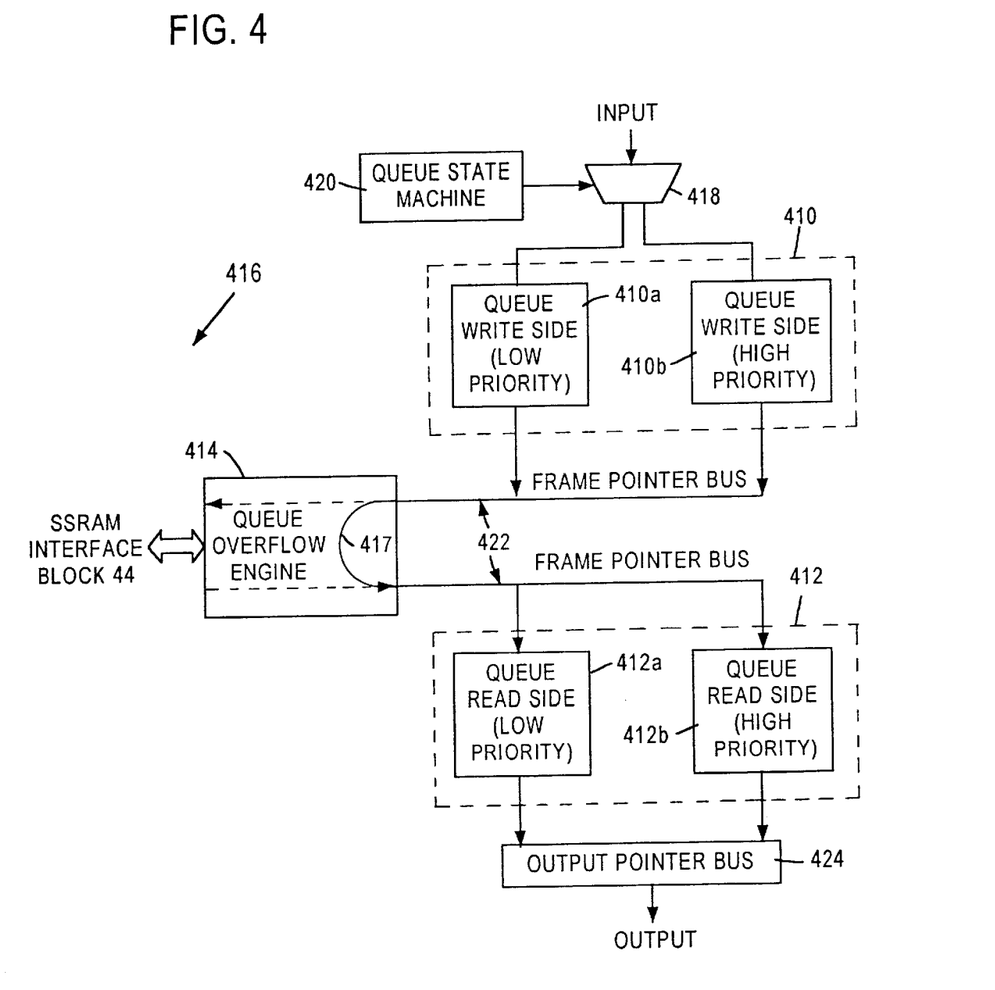
FIG. 4 is a block diagram of a single output queue of the switch subsystem constructed in accordance with an embodiment of the present invention.

FIG. 4 is a block diagram of the external structure of an output queue 400 according to an embodiment of the present invention. As is apparent from FIG. 4, the output queue 400 illustrated has a three-part configuration. For highest performance, it is preferable to keep all of the queuing structure on the chip (referring to the multiport switch 12). The output queue 400 includes a high performance, low capacity section that is on-chip, and an overflow area that is off-chip. The overflow area allows the queue to serve as a large capacity queue as needed, albeit with a relatively lower performance than the on-chip portion.

The output queue 400 illustrated in FIG. 4 has three physical sections. These include a queue write side 410, a queue read side 412, and a queue overflow area 416 which incorporates a queue overflow engine 414, the external memory interface block 44, and the external memory 36. The output queue 400 accesses the external memory 36 through the external memory interface 34, as described earlier. The present invention takes advantage of the bursting nature of current memories, so that the data (e.g., frame pointers) is sent on and off the chip to the output queue overflow area 416 in bursts over the external memory interface block 44 that connects the network chip 12 to the external memory 36.

The queue write side 410 and the queue read side 412 are located on the multiport switch 12. The write side 410 and the read side 412 are considered to be small, expensive resources. By contrast, the overflow area 416, forming the third part of the output queue 400, is large and inexpensive. The write side 410 and the read side 412 provide high performance, while the path through the overflow area 416 provides a low-performance, large capacity path.

According to the exemplary embodiment illustrated in FIG. 4, the queue write side 410 may include a low priority portion 410*a* and a high priority portion 410*b*. A switching circuit, such as a multiplexer 418, may be provided to forward entries to either the low priority portion 410*a* or the high priority portion 410*b* of the queue write side 410. In such a case, the multiplexer 418 may direct the data to the appropriate portion of the queue write side 410 under the control of a queue state machine 420, which examines certain fields in the entry to determine its priority. Alternative logic circuitry may also be provided to receive the entries and determine to which portion of the queue write side 410 the entries should be forwarded.

Similar to the queue write side 410, the queue read side 412 may include a low priority portion 412*a* and a high priority portion 412*b*. The queue overflow engine 414 examines each entry prior to transfer onto the frame pointer bus 422. Entries that are determined to be low priority are transferred to the low priority portion 412*a* of the queue read side 412, while entries that are determined to be high priority are transferred to the high priority portion 412*b* of the queue read side 412. Entries are retrieved from the output queue 400 via the queue read side 412 along an appropriate bus, such as the exemplary output pointer bus 424 illustrated in FIG. 4.

The queue write side 410 is configured to store a prescribed quantity of entries on the switch. Entries are transferred from the queue write side 410 to the queue read side 412 along a frame pointer bus 422 by means of the queue overflow engine 414. Once the queue write side 410 has a sufficient quantity of data, the overflow engine 414 transfers data from the queue write side 410 in order to allow input of additional entries. The queue read side 412 also stores a prescribed quantity of data. The queue overflow engine 414 monitors the amount of data currently stored in the queue read side 412, and, if data for that queue 400 is stored in the external memory 36, transfers data into the queue read side 412 along the frame pointer bus 422 until the external memory 36 is cleared or the queue read side 412 is full.

In operation, entries are input to the queue write side 410 from an external source via an appropriate transfer bus (by means of multiplexer 418). The entries may be received from a variety of sources, such as, for example, the port vector FIFO 56. Each entry is a frame pointer that points to the first buffer in external memory in which the first 240 bytes of a data frame are stored. Additionally, depending on the specific implementation of the queue structure 400, the entries may be prioritized and forwarded to either the low priority portion 412a or the high priority portion 412b of the queue write side 412.

Each entry flows through and reaches the bottom of the queue write side 410, either the low priority portion 412a or the high priority portion 412b. At this point, the queue overflow engine 414 makes a decision as to what to do with the entry. If there is space in the queue read side 412, and the overflow area 416 for the output queue 400 is empty, then one or more entries are passed directly from the queue write side 410 to the queue read side 412 along the path designated by the reference numeral 417. This passing of the entry (or entries) directly from the write side 410 to the read side 412 (referred to as "trickling") is performed entirely on the network chip 12, and is therefore a low-latency, fast flow-through of an entry.

If the queue read side 412 is full, and there is at least a burst-size amount of data (e.g., 16 bytes worth of entries) in the queue write side 410, then the data is written in a burst fashion into the overflow area 416 for the output queue 400. If the queue read side 412 is full, but there is not yet a burst-size amount of data in the queue write side 410, then the entry remains in the queue write side 410 and nothing further is done. Eventually, the queue read side 412 will empty, and when the queue read side 412 has enough space to accommodate a burst-size amount of data, and there is data in the overflow area 416, a burst of data is provided from the overflow area 416 into the queue read side 412.

The entries are forwarded to the queue read side 412 by the queue overflow logic 414 according to the prioritization identified at the queue write side 410, and the status of entries stored in both the external memory 36 and queue read side 412. Entries are then retrieved from the queue read side 412 (based on priority) via an appropriate bus, such as, for example, the output pointer bus 424 illustrated in FIG. 4.

According to the arrangement of the present invention, if there are a lot of entries arriving at the output queue 400, these entries will be placed into the overflow area 416 to avoid overflowing the read side 412. Hence, the discarding of data frames is largely prevented with the output queue 400 of the present invention. In addition, the total amount of memory dedicated to the overflow areas 416 may be readily changed by changing the size of the external memory 36. Furthermore, the sizes of the individual specific overflow areas 416 are programmable to customize the queue sizes, without affecting the performance of the output queues 400. Nonetheless, there are still situations when traffic intensity to one of the network stations 14 will result in congestion, hence requiring implementation of flow control techniques. As used herein, flow control corresponds to the generation and reception of MAC control PAUSE frames that inhibit transmission of data frames for a specified period of time.

Flow Control

Figure 5A:
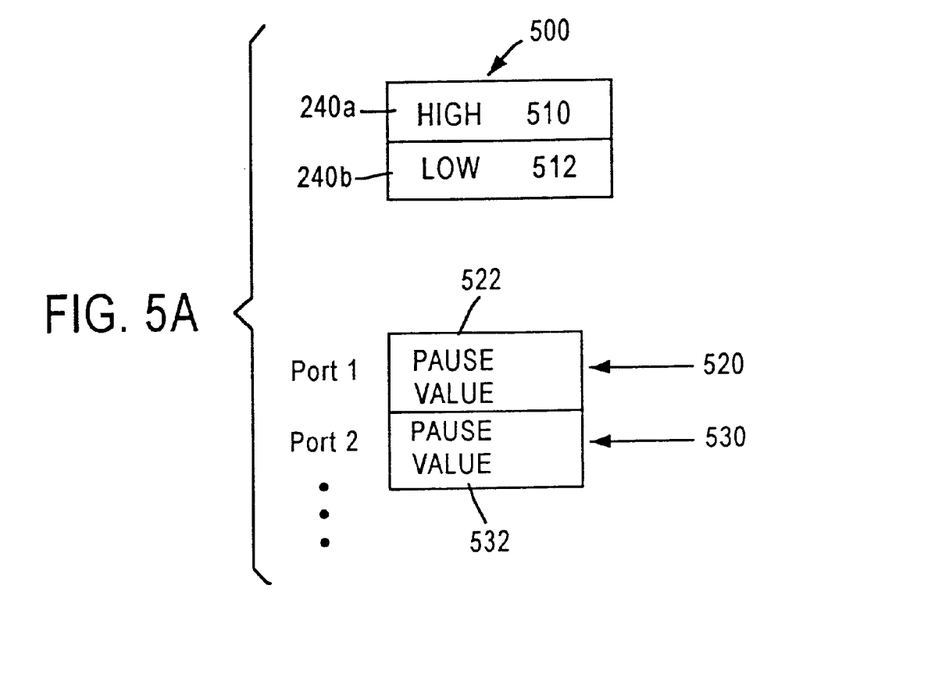
FIG. 5A is a diagram illustrating a portion of the configuration status registers of FIG. 2 that are programmable according to an embodiment of the present invention.

FIG. 5A is a block diagram illustrating a portion of the configuration status registers 52 of FIG. 2 that are programmable by the host processor 40. As shown in FIG. 5A, the control registers 52 include a set of threshold registers 500 for storing watermark thresholds, or saturation levels, for the internal resources of the output ports of the network switch 12. The saturation level corresponds to a level that, if exceeded, can result in a loss of data by a particular port of the network switch 12. Specifically, a high priority threshold register 510 is used to store the value of the watermark threshold level for the high priority input 410b of the output queue 400, and low priority threshold register 512 is used to store the watermark threshold level for the low priority input 410a of the output queue 400. According to the disclosed embodiment of the present invention, the saturation levels are determined based on the number of entries currently stored in the output queue 400. Hence, the watermark threshold levels identify a maximum number of entries that are allowed in the specified output queue 400. As previously stated, the values of the low and high priority watermark thresholds may be independently and dynamically set according to a maximum number of free frame pointers stored in low and high priority inputs of the output queue 400.

The present invention can be further configured to provide multiple levels of priority. For example, rather than providing high and low priority threshold registers 510 and 512, each set of threshold registers 500 may be configured to provide level1, level2, level3, . . . , etc. priority threshold registers. In addition, each set of threshold registers 500 may include a high-level threshold register that stores a value corresponding to a high watermark threshold level, and a low-level threshold register that stores a value corresponding to a low watermark threshold level.

The configuration status registers 52 also include a first programmable PAUSE registers 520. The programmable PAUSE register 520 stores a pause interval value (in register 522) that can be dynamically programmed as specified by the host controller for one of the output ports. The pause interval value stored in register 522 may have exemplary values of 5 slot times, 1024 slot times, etc. The configuration status registers 52 also include additional programmable PAUSE registers (only one shown), such as programmable Pause register 530. Similar to the first programmable PAUSE register 520, programmable PAUSE register 530 stores a pause interval value (in register 532) for a second output port. Additional programmable PAUSE configuration registers may be provided for each of the output ports supported by the multiport switch 12. Hence, the use of multiple programmable PAUSE registers (i.e., one for each output port) that store different pause interval values for each output port allows the host CPU 32 to maximize the data throughput of the multiport switch 12, while optimizing flow control for each individual port based on network traffic. Alternatively, the disclosed arrangement may be simplified by using a single programmable PAUSE register to store a pause interval value for use by all the output ports of the multiport switch 12.

Figure 5B:
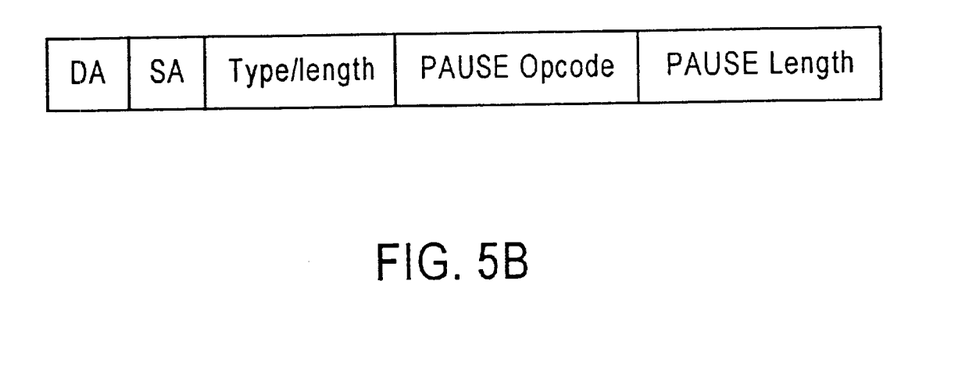
FIG. 5B illustrates the structure of an exemplary PAUSE frame according to an embodiment of the present invention.

FIG. 5B illustrates the structure of an exemplary PAUSE frame that is transmitted when the number of frame pointers in one of the output queues 400 has exceeded the watermark threshold for that queue (either the high priority threshold or the low priority threshold). As illustrated in FIG. 5B, the PAUSE frame includes a destination address field (DA), a source address field (SA), a Type/Length field, an Opcode field, and a PAUSE length. The destination address field stores a reserved multicast destination address that is determined based on the particular configuration of the network system. The value of the multicast destination address is identical for all PAUSE frames transmitted by the workstations connected to the multiport switch. The source address field specifies the address of the MAC transmitting the PAUSE frame as a result of its output queue 400 being congested. The Type/Length field specifies the Ethertype, while the Opcode field contains a MAC control Opcode. The values stored in the Ethertype and Opcode fields are determined according to the specific networking protocol (i.e., IEEE 802.3x) being implemented.

The PAUSE length specifies, in terms of slot times, the delay interval that must be observed by the workstation identified by the destination address. The length of the pause interval value is in the range of 0–65535 slot times, and is retrieved from one of the registers 522 or 532, depending on the port. The pause interval value programmed into registers 522 and 532 can be based on the severity of the congestion. For example, the pause length can be selected based on the average throughput of entries for the congested output queue 400, or the time required to process each entry in the output queue. For example, if the average throughput of entries in the output queue 400 is high or the time required to process entries is long, then selection of a higher pause interval value will function to allow processing of sufficient entries without congesting the output queue 400. Similarly, if the average throughput of entries in the output queue 400 is low or the time required to process entries is short, then selection of a short pause interval value may be selected. Various other criteria may be used for selecting an appropriate pause interval depending on the specific application.

According to the disclosed embodiment of the invention, a different threshold value may be set for the high priority 410*b* and low priority 410*a* inputs of the output queue 400. Furthermore, each of the thresholds may be independently set, in real time, to accommodate the throughput of the low and high priority inputs (410*a*, 410*b*) of the output queue 400. Hence, the Opcode field of the PAUSE frame may include information that indicates whether the PAUSE frame corresponds to the high priority threshold value or the low priority threshold value.

The MIB counters 48, previously described with reference to FIG. 2, include a transmit flow control counter and a receive flow control counter for counting the number of PAUSE frames transmitted or received by each of the network station. For example, each time traffic congestion at an output port for a first network station exceeds the threshold value, a PAUSE frame is transmitted to a second network station that is currently transmitting data to the first network station. The host CPU 40 will then automatically increment the value of the transmit flow control counter for the output port associated with the first network station. When the second network station receives the PAUSE frame, the host CPU 40 increments the value of the receive flow control counter for its associated output port.

Figure 6:
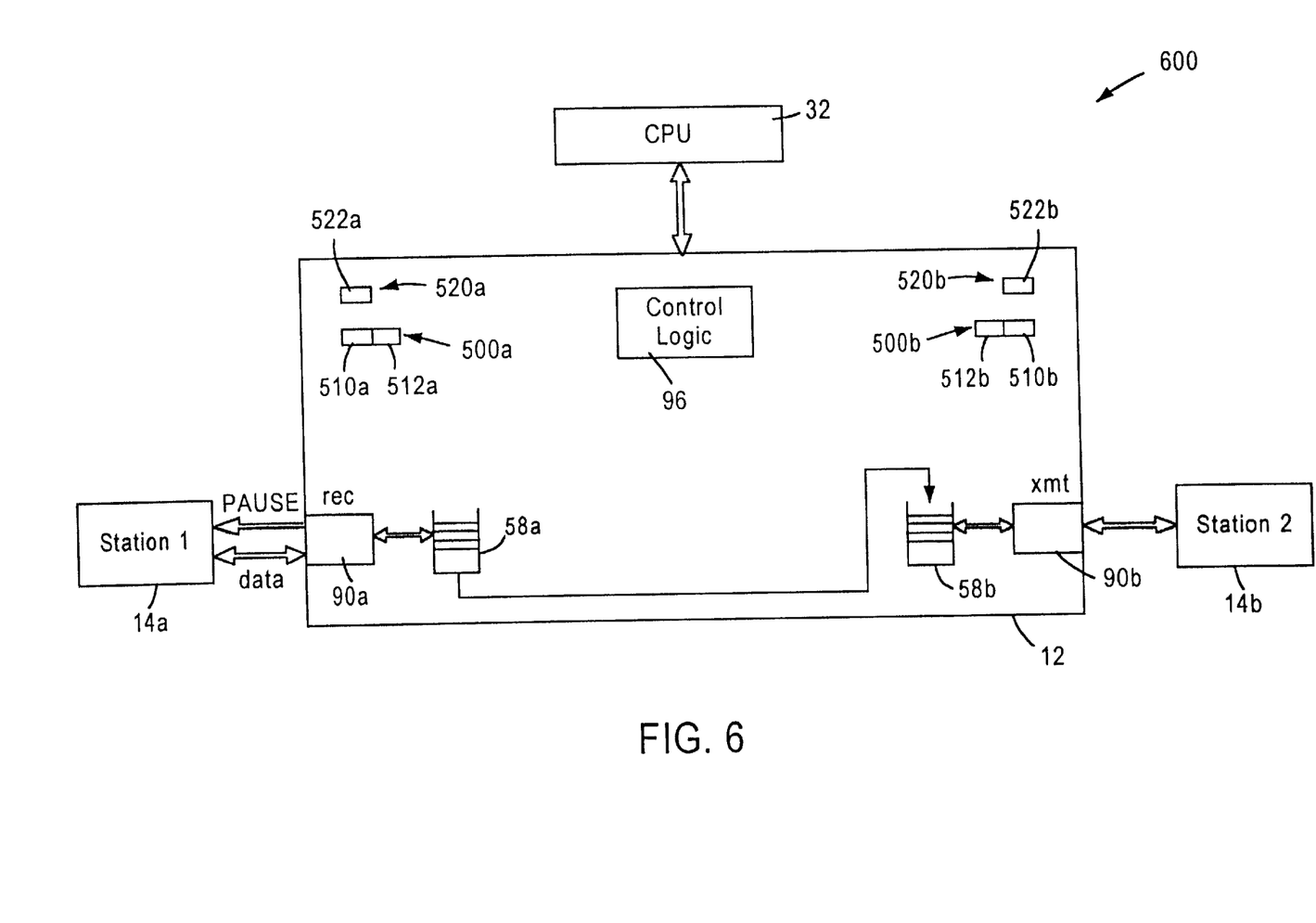
FIG. 6 is a block diagram illustrating the manner in which the flow of data is controlled between two network stations.

FIG. 6 is a block diagram illustrating an arrangement 600 for connecting two network stations 14*a*, 14*b* through the network switch 12 and controlling the flow of data therebetween. The arrangement 600 illustrated in FIG. 6 is presented with minimal detail in order to facilitate understanding of the manner in which the flow of data is regulated between two workstations 14*a*, 14*b* according to an exemplary embodiment of the present invention.

The arrangement 600 of FIG. 6 includes a first network station 14*a* and a second network station 14*b* that are coupled to each other via the multiport switch 12. In addition, an external management device such as the host CPU 32 is logically coupled to the multiport switch 12 in order to control certain operations. For each network station 14*a* and 14*b* illustrated in FIG. 6, the multiport switch 12 includes, in part: output ports 90*a*, 90*b*; threshold registers 500*a*, 500*b*; PAUSE registers 520*a*, 520*b*, and control logic 96. For example, output port 90*a*, a set of threshold registers 500*a*, and a set of PAUSE registers 520*a* are logically coupled to the first network station 14*a*, while output port 90*b*, a second set of threshold registers 500*b*, and a second set PAUSE registers 520*b* are logically coupled to the second network station 14*a*. As previously stated with respect to FIG. 6, each set of threshold registers 500*a*, 500*b* includes a high priority threshold register 510*a*, 510*b* and a low priority threshold register 512*a*, 512*b*. Each set of PAUSE registers 520*a*, 520*b* includes a programmable PAUSE register 522*a*, 522*b*.

The first and second network stations 14*a*, 14*b* are each connected to the multiport switch 12 through their respective output ports 90*a*, 90*b* in order to facilitate data transfer therebetween. Each output port 90*a*, 90*b* includes an output queue 58*a*, 58*b* that stores frame pointers that identify the locations in external memory 36 where a corresponding data frame is stored. The data frame may either originate from, or be destined to, either of the output ports 90*a*, 90*b*.

The threshold registers 500*a*, 500*b* are used to store threshold values for each output queue 58*a*, 58*b* corresponding to the output ports 90*a*, 90*b*, while the PAUSE registers 520*a*, 520*b* store the value of the pause interval value that is transmitted in the PAUSE frame to specify a pause length when one of the ports becomes congested. The host CPU 32 is used, in part, to program values into the threshold registers 500*a*, 500*b* and the PAUSE registers 520*a*, 520*b* based on various conditions. For example, according to one embodiment of the present invention, the host CPU 32 monitors the flow of data through the multiport switch 12 and selectively programs the values of the threshold registers 500*a*, 500*b* in real time, based on the amount of data flowing through each individual output port 90 of the multiport switch 12. As previously mentioned, if the output queue 58*b* for the second output port 90*b* is receiving a large quantity of data from the first output port, then the host CPU 32 can program longer pause interval values into the threshold registers 500*b* to allow sufficient time for processing of entries by the second output queue 58*b*. In addition, if the amount of time required by the second output queue 58*b* to process entries is short, then the host CPU 32 can program a short threshold value that is sufficient to prevent unnecessary discarding of data frames.

In order to enable flow control through the multiport switch 12 for a particular output port 90, the host CPU 32 must inform the external PHY device (i.e., the first network station 14*a*) that flow control is supported. This is accomplished by forcing the first network station 14*a* to participate in an auto-negotiation process that determines if both link partners support flow control. If both link partners support flow control, then the host CPU 32 configures the particular parameters necessary to implement the flow control process such as, for example, the length of the flow control frame. Once the host CPU 32 has enabled flow control between two link partners, the ports will automatically respond to congestion without further intervention from the host CPU 32.

The control logic 96 of the multiport switch 12 continually monitors the status of the output queues 58 in order to detect when an output queue 58*a*, 58*b* has reached the threshold value programmed into the threshold register 500*a*, 500*b* by the host CPU 32. As previously stated, the output queues 58*a*, 58*b* according to the disclosed embodiment of the present invention include low and high priority portions. Accordingly, the threshold registers 500a, 500b may store independent values for each portion, particularly when the low priority and high priority portions have different capacities. The control logic 96 illustrated in FIG. 6 also incorporates the port vector FIFO 56 previously described. Each time a data frame is received and stored in the external memory 36, the port vector FIFO 56 places a frame pointer corresponding to the location of the data frame into the output queue 58 of the port that will forward the data frame.

As illustrated in FIG. 6, the first network station 14a is currently transmitting data frames to the second network station 14b. Upon detecting that output queue 58b has reached its threshold value, the control logic 96 is responsible for implementing a flow control technique to prevent output queue 58b from becoming completely full, and possibly overflowing. An output queue 58 becomes full when too many data frames are being transferred to its associated output port 90b. This may be a result of too many network stations simultaneously transmitting data frames to the second network station 14b.

Each time the multiport switch 12 receives a data frame that is destined for the second network station 14b, the status of the output queue 58b associated with the second network station is examined. If the threshold value has been reached, then the port vector FIFO 56, shown in FIG. 6, will place the current frame pointer into output queue 58b, and the control logic 96 will examine the value of the pause interval stored in the PAUSE register 520b associated with the congested output port 90b. Next, the frame pointer is placed in output queue 58b. As the port vector FIFO 56 places the frame pointer into output queue 58b, it alerts the transmitting output port (i.e., output port 90a) that output queue 58b has reached its threshold value, and by generating a signal (based on the value stored in the PAUSE register 520b) that is in the form of a single clock pulse. The signal is transmitted to output port 90a. Output port 90a generates a PAUSE frame upon receiving the signal from the port vector FIFO 56. The PAUSE frame is generated and includes PAUSE length information that is based on the value of the pause interval stored in register 520a or 520b, as appropriate, and forwarded to the first network station 14a.

The PAUSE frame causes the first network station 14a to discontinue transmission of data frame, to the second network station 14b, for the duration of the pause interval value specified. According to one embodiment of the present invention, the PAUSE frame may be transmitted to every network station capable of transmitting data to the second network station 14b rather than only the network stations that are currently transmitting data frames. When the first network station 14a receives the PAUSE frame, various fields (e.g., Ethertype, MAC DA, Opcode) are examined in order to determine if the PAUSE frame is valid. If the PAUSE frame is valid, then the receive flow control counter is incremented.

The first network station 14a initiates the pause interval after the PAUSE frame has been determined valid. In addition, the first network station 14a continues transmission of any data frame that is currently in progress when the PAUSE frame is received. Once the current data frame has been transmitted, additional data frames that are queued for transmission will not be transmitted until the duration specified by the pause interval value has expired.

According to one embodiment of the present invention, the effect of the PAUSE frames are not cumulative. Specifically, if the first network station 14a receives a second PAUSE frame while executing a first pause interval count, the first network station 14a will discontinue its current count. A new count will then be initiated based on the value specified by the second pause interval. For example, if the first network station 14a receives a PAUSE frame that specifies a pause interval value of, for example, 100, then the first network station 14a will begin its time-out counting period as soon as the current data frame has been transmitted. Next, assume that the first network station 14a receives a second PAUSE frame when it reaches a count of 50. The first network station 14a will discontinue the first count and initiate a second count. Thus, the first network station 14a will stop counting at 50, and initiate a second count that will continue until the value of second pause interval is reached. For example, if the second pause interval has a value of 200, then the first network station 14a will stop counting at 50, reset its internal counter, and begin counting until it reaches 200.

The present invention allows each output port to be individually monitored so that flow control may be implemented for individual output ports during full-duplex operation. Hence, the present invention provides flexibility in network design, enabling a host processor 32 to adjust each individual output port based on network traffic. Alternatively, the disclosed arrangement may be simplified by using a single set of PAUSE registers for threshold and configuration values to be used by all of the ports.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of regulating the flow of data between plural network stations through a network switch, the method comprising the steps:

setting respective threshold values that indicate a saturation level for the internal resources of each transmit port of the switch, said setting of respective threshold values includes setting a first threshold value for a low priority portion of an output queue, and setting a second threshold value for a high priority portion of the output queue;

receiving, by a receive port of the switch, a data frame destined to a transmit port, the data frame being received from a first of the plural network stations;

determining if the internal resources of the transmit port have reached the threshold value for that transmit port; and selectively transmitting a PAUSE frame that specifies a pause interval value if the internal resources of that transmit port have reached the threshold value, the PAUSE frame causing the first network station to discontinue transmission of data frames to that transmit port for the duration of the pause interval value.

2. The method of claim 1, further comprising the step of dynamically changing the threshold value based on the level of throughput of the transmit port.

3. The method of claim 1, further comprising the step of incrementing the value of a transmit counter that specifies the total number of PAUSE frames transmitted by the receive port.

4. The method of claim 1, wherein the step of setting a threshold value comprises the step of setting a threshold value for an output queue configured to store frame pointers that identify locations in an external memory where received data frames that must be output by the transmit port are located.

5. The method of claim 4, wherein the step of determining if external resources of the transmit port have reached the threshold value comprises the step of determining if the number of frame pointers stored in the output queue have reached the threshold value.

6. The method of claim 1, further comprising a step of storing a pause interval value in at least one pause register of the network switch.

7. The method of claim 6, wherein the step of selectively transmitting a PAUSE frame comprises the steps:
   retrieving the pause interval value stored in the at least one pause registers; and
   constructing a PAUSE frame that includes the pause interval value retrieved from the at least one pause registers.

8. The method of claim 1, wherein the step of selectively transmitting a PAUSE frame comprises the steps:
   alerting the receive port that the transmit port has reached the threshold value; and
   transmitting, by the receive port, the PAUSE frame to the first network station.

9. The method of claim 8, wherein the step of alerting the receive port comprises a step of transmitting a signal from a port vector FIFO that places frame pointers in the output queues, to the receive port.

10. The method of claim 1, wherein upon receiving the PAUSE frame, the first network station performs the steps:
    completing transmission of any data frame that is currently in progress; and
    waiting until the duration specified by the pause interval value expires before transmitting any additional data frames that are queued for transmission.

11. The method of claim 9, further comprising the steps:
    receiving a second PAUSE frame that specifies a second pause interval value; and
    causing the first network station to restart and continue counting based on the value specified by the second pause interval.

12. The method of claim 9, further comprising the step of incrementing the value of a received counter that specifies the total number of PAUSE frames received by the first network station.

13. An arrangement for regulating the flow of data between plural network stations through a network switch, said plural network stations being connectable to the network switch, the arrangement comprising:
    a receive port for receiving data frames from a first of said plural network stations;
    a transmit port for outputting the received data frames to a second of said plural network stations;
    a programmable threshold register for storing a threshold value that indicates a saturation level for internal resources of said transmit port, wherein said internal resources include an output queue for storing frame pointers that identify locations in an external memory where said received data frames are located and said threshold value specifies a threshold number of frame pointers that may be stored in said output queue; and
    control circuitry for selectively transmitting a PAUSE frame to said first network station upon detecting that the internal resources of said transmit port have reached said threshold value, said PAUSE frame specifying a pause interval value and causing said first network station to discontinue transmission of data frames to said transmit port until said pause interval value has expired,
    wherein said programmable threshold register stores a first threshold value that specifies a threshold number of frame pointers that may be stored in a low priority portion of said output queue, and a second threshold value that specifies a threshold number of frame pointers that may be stored in a high priority portion of said output queue.

14. The arrangement of claim 13, further comprising a pause register for storing said pause interval value.

15. The arrangement of claim 13, wherein said control circuitry includes logic configured to dynamically program said pause interval value based on the rate of throughput of said transmit port.

16. The arrangement of claim 13, wherein
    said output queue outputs an overflow signal when the number of frame pointers stored therein has reached said threshold value; and
    said control circuitry transmit said PAUSE frame in response to detection of said overflow signal.

17. The arrangement of claim 13, wherein said control circuitry includes a port vector FIFO that places frame pointers for queuing into output queues of said network switch, and said control circuitry is logically coupled to said receive port.

18. The arrangement of claim 17, wherein:
    said port vector FIFO outputs a signal to said receive port, said signal being indicative of said internal resources reaching said threshold value; and
    said receive port outputs said pause frame to said first network station in response to receiving said pulse.

19. The arrangement of claim 13, further comprising a management register for storing the value of a transmit flow control counter that indicates the total number of PAUSE frames that have been transmitted by said receive port.

20. The arrangement of claim 19, wherein said management register further stores the value of a receive flow control counter that indicates the total number of PAUSE frames that have been received by said transmit port.

21. The arrangement of claim 13, wherein upon receiving said PAUSE frame, said first network station is configured to perform the steps:
    complete transmission of any data frame that is currently in progress; and
    wait until said pause interval value expires before transmitting any additional data frames that are queued for transmission.

22. The arrangement of claim 21, wherein said first network station is further configured to perform the steps:
    receive a second PAUSE frame that specifies a second pause interval value; and
    restart a new count based on the value of said second pause interval.

* * * * *

UNITED STATES PATENT AND TRADEMARK OFFICE
CERTIFICATE OF CORRECTION

PATENT NO.    : 6,405,258 B1
DATED         : June 11, 2002
INVENTOR(S)   : Bahadir Erimli et al.

It is certified that error appears in the above-identified patent and that said Letters Patent is hereby corrected as shown below:

<u>Title page,</u>
After the data in the inventor section "[76]", insert:

-- [73] Assignee:  Advanced Micro Devices, Inc.
              Sunnyvale, CA --

Signed and Sealed this

Tenth Day of September, 2002

*Attest:*

JAMES E. ROGAN
*Attesting Officer*  *Director of the United States Patent and Trademark Office*